United States Patent [19]

Roberts

[11] 4,186,079
[45] Jan. 29, 1980

[54] PYROLYSIS PROCESS
[75] Inventor: Scott C. Roberts, Houston, Tex.
[73] Assignee: Shell Oil Company, Houston, Tex.
[21] Appl. No.: 970,068
[22] Filed: Dec. 15, 1978
[51] Int. Cl.$^2$ ............................................... C10G 9/32
[52] U.S. Cl. .................................... 208/127; 48/197 R
[58] Field of Search ....................... 48/197 R; 208/127
[56] References Cited
U.S. PATENT DOCUMENTS

| 2,527,575 | 10/1950 | Roetheli | 208/127 |
| 2,885,350 | 5/1959 | Brown et al. | 208/127 |
| 3,414,504 | 12/1968 | Oldweiler | 208/127 |
| 4,077,869 | 3/1978 | Moritz | 208/127 |

*Primary Examiner*—Herbert Levine
*Attorney, Agent, or Firm*—Albert J. Adamcik

[57] ABSTRACT

An integrated process for production of light hydrocarbons and synthesis gas is disclosed. The process is characterized by pyrolysis of hydrocarbonaceous materials utilizing a solid particulate heat carrier, the heat carrier also providing heat for the conversion of a carbonaceous material to synthesis gas.

3 Claims, 1 Drawing Figure

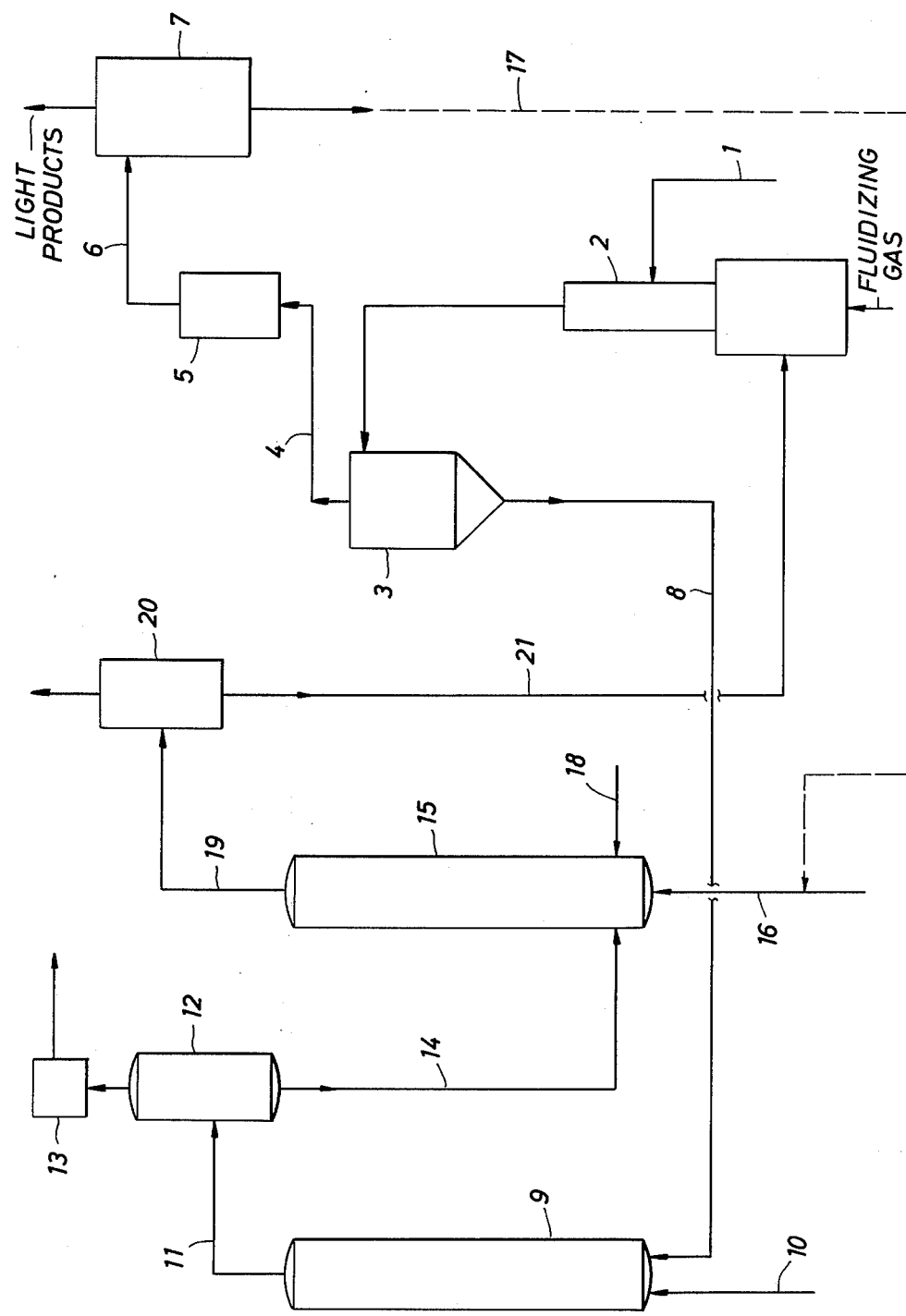

PYROLYSIS PROCESS

BACKGROUND OF THE INVENTION

Rapid escalation of chemical feedstock costs in recent years has spurred efforts to utilize sources which were previously considered uneconomic. One result of such efforts is the development of processes for the cracking of heavier crude oil fractions in order to produce ethylene and other chemical feedstocks.

One difficulty inherent in the utilization of such fractions is that they are so hydrogen deficient that the yield of valued materials is lower and the capital and operating costs are increased. On the other hand, in general, heavier and higher sulfur feedstocks have a decreasing range of end uses and are valued accordingly. Thus, such feedstocks appear to be singularly economically attractive. One process, that described in U.S. Pat. No. 2,527,575, utilizes heavy feedstocks in a multistage process, the method being characterized by severe heat treatment to coke the feedstock and produce, inter alia, some normally gaseous hydrocarbons. However, the apparent severity of the coking procedure described would limit the volume of gaseous hydrocarbons produced. Accordingly, a cracking process which capitalized on the low cost of heavy feedstock materials, overcame the environmental and disposal problems associated with the residual products, and which produced good yields of light olefins and other useful products could have great economic importance. The present invention is such a process.

SUMMARY OF THE INVENTION

In accordance with the invention, hydrocarbon-containing materials are charged continuously to a pyrolysis zone where they are contacted with a fluidized or entrained particulate or finely-divided heat carrier, the heat carrier being preheated sufficiently to supply the heat required for pyrolysis. A volatile light hydrocarbon product stream and highly reactive coke, deposited on the heat carrier, are separately and continuously withdrawn. The variables of the pyrolysis are controlled so that overcracking does not occur; i.e., the heat treatment results in volatile, especially olefinic, products and some coke deposited on the heat carrier. The volatile products are recovered, as outlined more fully hereinafter, and the coke containing or coated heat carrier is passed to a combustion zone where the heat carrier is contacted with an oxygen-containing gas to combust the coke and heat the carrier to elevated temperatures. The combustion gases pass from the combustion zone, and may be treated in conventional fashion, while the heated heat carrier is passed to a gasification zone where a quantity of heat in the carrier is used to gasify a carbonaceous feedstock, such as a heavy hydrocarbon-containing feed, and produce synthesis gas. The heat carrier is then passed to the pyrolysis zone, completing the cycle.

The volatile products stream from the pyrolysis zone is quenched, and conventional separation, including fractionation, procedures may be employed to separate and recover the light hydrocarbon materials. In a preferred embodiment of the invention, the bottoms fraction from the separation zone is used as the feed to the gasification zone. The invention thus provides a process for the production of olefins which allows advantageous disposition of low value coke and heavy oil by-products without production of troublesome low B.T.U. gas.

DETAILED DESCRIPTION OF THE INVENTION

The composition of the hydrocarbon-containing material employed as the feed to the pyrolysis zone is widely-variable. Any suitable hydrocarbon containing feedstock may be employed, but the real value of the invention lies in the ability to treat heavy oils including residual oils, such as topped or reduced crude mineral oils. Crude oil, synthetic crude oil, long residues, shale oil, coal oils, etc., and mixtures thereof, may be used. "Pitch", a product that even today poses disposal problems, is eminently suitable. Higher grade materials, such as gas oils, may also be used. In sum, any material which contains sufficient hydrocarbonaceous material which may be cracked to produce the products desired, is suitable.

The pyrolysis zone will be operated under conditions to crack the hydrocarbonaceous material to produce light hydrocarbons, such as ethylene and propylene. Because conditions vary from feedstock to feedstock, conditions of pressure, temperature, space velocity, etc., are widely variable. Those skilled in the art are aware of appropriate treatment for given feedstocks, or may readily determine appropriate conditions in light of the disclosure herein.

In general, appropriate temperatures in the pyrolysis zone will range from 1250° F. to 1700° F., with temperatures of from 1350° F. to 1600° F. being preferred. As indicated, the heat will be supplied primarily by finely divided fluidized heat carrier particles, the particles being supplied at a temperature of 1500° F. to 2000° F., preferably 1600° F. to 1800° F. Pressures are not critical, and may be suitably adjusted by those skilled in the art. Generally, pressures less than 5 atmospheres are preferred.

The composition of the finely divided solid heat carrier may be varied widely. Suitable inert solid heat carrier materials are well known in the art, and the particular heat carrier chosen is a matter of choice, given the requirements outlined herein. The heat carrier may also contain suitable catalytic agents to assist in the reaction, but this is not a requirement of the invention. Average particle size will range from 50 microns to 1000 microns, with average particle sizes of 50 microns to 300 microns being preferred. Preferred heat carrier materials include alumina and coke. Coke is particularly advantageous since no extraneous materials are present in the system.

The particles and the feedstock may be fluidized or entrained with a suitable gas which is at least substantially inert to the feedstock, carrier or products. Steam, inert gases, water gas, natural gas, flue gases or the like may be used to fluidize the solids. If desired, a portion of the heat required in the pyrolysis zone may be supplied by partial combustion within the zone. An oxidizing gas, such as air or oxygen or mixtures thereof, may replace part of the fluidizing gas for this purpose. Generally, the carrier will be entrained or fluidized in a high velocity gas stream, contacted with the atomized or vaporized feedstock, and quickly separated. Sufficient fluidizing gas is used, e.g. 0.3 lb. to 3.0 lb. per lb. of feedstock, to entrain or fluidize the heat carrier and reduce the partial pressure of the pyrolysis products.

Control of the feed rate of the feedstock, fluidizing gas and heat carrier will be varied, depending on the feedstock, as will be understood by those skilled in the art, to provide, under the heat transfer conditions in the entrained flow or fluidized bed, a relatively short residence or contact time of the pyrolysis products. This contact time is critical, in order, under the conditions mentioned, to preserve high yields of the relatively reactive olefinic products. While the residence time will vary, as indicated, the total residence time of the feed and products in the pyrolysis zone will generally be from 0.09 seconds to 3 seconds, preferably from 0.3 seconds to 1.0 seconds. After suitable contact of the heat carrier and the feedstock, the carrier must be separated from the products formed. Separation is readily accomplished by appropriate inertial devices, such as a cyclone. The particular means or devices chosen for separation of the heat carrier from the product stream are within the ambit of those skilled in the art, and form no part of the invention.

As indicated, the products from the pyrolysis or cracking zone are treated for recovery of the desired light hydrocarbons. Generally, after separation from the heat carrier, the product stream will be quenched and sent to appropriate separation equipment. Normally, the quench will lower the temperature of the product stream to 600° F. to 1200° F., either in one or more stages. In the separation of the desired fractions of the product stream, a bottoms fraction will be produced which is undesired as a conventional feedstock, but which has useful carbon values. In a preferred embodiment of the invention, this factionator bottoms is used as the feed to the gasification zone.

Spent heat carrier material, i.e., that which has transferred a substantial portion of its heat in the pyrolysis zone, is passed, after separation from the product stream, to a combustion zone where the coke deposited during pyrolysis is burned. In the continuous process of the invention, the combustion zone suitably comprises a lift pipe heater or a dense phase fluidized bed, and variables such as gas velocity, reactor size, etc., may be adjusted by those skilled in the art. An oxygen-containing gas, preferably air, is supplied to the combustion zone in sufficient quantity to provide sufficient oxygen to complete combustion of the coke deposited on the carrier and any supplemental fuel, if supplied, to heat the carrier to a temperature of from about 1700° F. to about 2300° F. In general, the oxygen-containing gas will be supplied in an amount equivalent to 100 percent to about 150 percent of the stoichiometric requirement. If coke is used as the carrier material, the amount of oxygen supplied is regulated more carefully. Excess oxygen, in the case of coke as a heat carrier material, will preferably be limited to not more than about 10 percent excess. The off-gas from the combustion zone may be treated in known fashion.

After separation from the off-gas, the hot heat carrier is passed to a synthesis gas generation zone where, in fluidized form, it contacts an atomized heavy residue material and hot steam to produce synthesis gas. As indicated, the temperature of the heat carrier entering the synthesis gas generation zone will be from about 1700° F. to about 2300° F. The heat expended in generating the synthesis gas will lower the temperature of the heat carrier about 100° F. to 300° F. Oxygen may also be supplied to the synthesis gas generation zone to increase conversion of the residue and to provide some of the heat requirement through partial combustion. Nonetheless, the bulk of the heat required is supplied by the heat carrier material. The carrier is fluidized by any suitable gas, preferably superheated steam, carbon dioxide or mixtures thereof. Either a dense phase or fast fluidized bed gasifier may be used, with a fast fluidized bed (10–30 fps superficial gas velocity) preferred. It is an advantage of the invention that a variety of carbonaceous feedstocks, such as heavy carbonaceous feeds or residues, may be used for this zone, but the most convenient feed, which may or may not be supplemented, is the fractionator bottoms from the pyrolysis effluent recovery system. Other carbonaceous feedstocks, such as pitch, coal tars, coal, etc., may be used. The heat carrier, having spent only a minor portion of its heat, is then sent to the pyrolysis zone, thus closing the loop and recommencing the cycle.

In order to demonstrate the invention with greater specificity, reference is made to the accompanying drawing. For purposes of this illustration, all pipes, pumps, etc., have not been shown, as will be understood by those skilled in the art.

BRIEF DESCRIPTION OF THE DRAWING

The drawing is of the flow sheet type showing the flow of material between the several process step zones.

A vacuum pitch in line 1 is atomized into a steam fluidized riser column (2) where it contacts a hot heat carrier (e.g., 1900° F. alumina sand). The mixture flows through column (2) into unit (3) where the heat carrier, with deposited coke, and now at a temperature of 1400° F. to 1500° F., is disengaged from the product gases. Residence time is about 0.5 second.

The resulting product gas passes through line 4 to quench zone (5) where the reaction is quenched and the temperature lowered to less than 1000° F. Any suitable quench procedure may be utilized. From quench zone (5) the product gas passes through line (6) to separation zone (7) where the product gas is separated into the desired components. Ethylene, propylene, butadiene, gasoline, and other products are recovered, and off-gases may be treated as necessary. As indicated, however, the bottoms from this separation system, containing heavier carbonaceous components, are particularly useful, as will be described more fully hereinafter.

Concomitantly, the heat carrier, after disengagement from the product gas, and with coke deposited thereon, passes through line (8) to combustor (9) where the coke is burned off. Combustor (9) is preferably a line heater or lift pipe combustor, with air being introduced in line (10) in 15 percent excess (calculated). Supplemental fuel may be added (not shown). Combustion gas and heat carrier pass through line (11) to a separator, preferably an inertial device, (12) where the combustion gas is separated from the heat carrier. The combustion gas may be purified and subjected to heat recovery before exhaust in conventional fashion at (13).

The heat carrier, now at a temperature of about 2200° F., is passed through line (14) to synthesis gas generator (15). In gasifier (15) the heat carrier is contacted as a fast fluidized bed with a heavy residual material supplied by line (16). As noted previously, the preferred feed to this unit is the bottoms from the separation zone 7, the bottoms being supplied via line (17) (dotted line). Steam, in excess, is supplied through line (18), and optionally, a small amount of oxygen, e.g., 20 percent on a stoichiometric basis. The heavy residue is converted primarily to a stream containing $H_2$, $CO$, $H_2S$ and $CO_2$, and some coke will be left on the heat carrier. By supplying most of the heat to the gasifier with the solid heat carrier instead of by internal partial combustion, the oxygen consumption and unwanted CO$_2$ production are greatly reduced and the H$_2$/CO ratio is greatly increased. The heat carrier and product stream leave unit (15) through line (19) and pass to separation zone, preferably an inertial device, (20) where the product gas stream and heat carrier are separated. The product gas stream may be processed by conventional technology to produce a chemical grade synthesis gas. Heat carrier, now at a temperature of 1900° F., passes through line (21) to pyrolysis unit (2), recommencing the cycle.

In order to demonstrate the yields and product distribution obtainable by pyrolyzing a pitch feedstock utilizing a high temperature, short residence time procedure, the following experiment was run.

Light Arabian vacuum pitch (58.4 grams) was mixed with coal char prepared from Western sub-bitiminous coal, the pitch being added in an amount of about 30 percent by weight, based on the weight of the char. The mixture was fed into a tubular pyrolysis reactor, under the following conditions:

| Temperature | 1600° F. |
|---|---|
| Pressure | 16.1 psia |
| Residence time (calculated) | 0.092 seconds |
| Steam to solids ratio | 2.591 |

The yield of products, on a percent by weight basis, based on the weight of the pitch charged, is as follows:

| Hydrocarbon gases | 38.9 |
|---|---|
| Methane | 5.34 |
| Ethylene | 16.37 |
| Propylene | 7.48 |
| Light Hydrocarbons (90° F.–260° F.) | 3.7 |
| Heavy Hydrocarbons (300° F.+) | 33.6 |
| Coke | 17.8 |

Broken down more carefully, on a weight basis, the products were, as follows:

| C$_1$–C$_4$ | GMS | %w |
|---|---|---|
| Ethylene | 9.5034 | 16.37 |
| Propylene | 4.3405 | 7.48 |
| Methane | 3.1002 | 5.34 |
| Acetylene | .6527 | 1.12 |
| Ethane | .6374 | 1.10 |
| Methyl Acetylene | .6142 | 1.06 |
| Butadiene | 1.9145 | 3.30 |
| C$_4$H$_8$ | 1.2848 | 2.21 |
| C$_4$H$_{10}$ | .5000 | .86 |
|  | 22.5477 | 38.84 |
| C$_5$–260° F. |  |  |
| Gasoline | 2.1675 | 3.73 |
| Benzene | .2867 | .49 |
| Toluene | .3765 | .65 |

-continued

| C$_1$–C$_4$ | GMS | %w |
|---|---|---|
| 300 + Heavy Oil (5.67%wS) | 19.4800 | 33.56 |
| Coke - (On CHAR) | 10.3150 | 17.77 |

I claim as my invention:

1. A process comprising:
(a) continuously feeding a hydrocarbon-containing feedstock and a particulate heat carrier to a pyrolysis zone, the particulate heat carrier being at a temperature of 1500° F. to 2000° F. and being fluidized or entrained in the pyrolysis zone by an inert fluidizing or entraining gas, and contacting the feedstock and the heat carrier in the pyrolysis zone to produce an effluent product stream containing light hydrocarbons and heavy residual products, the total residence time of the feedstock and product stream in the pyrolysis zone being from 0.09 to 3.0 seconds, and concomitantly producing a cooler particulate heat carrier having carbonaceous deposits thereon; and continuously separating the effluent product stream from the heat carrier particles, quenching the product stream and recovering the light hydrocarbons in the product stream;
(b) continuously separating cooler particulate heat carrier having carbonaceous deposits thereon from the pyrolysis zone and passing said cooler particulate heat carrier to a heat exchange zone where the carbonaceous deposits are combusted with an oxygen-containing gas, supplemental fuel being added, if necessary, to heat the heat carrier to a temperature of from 1700° F. to 2300° F.;
(c) continuously removing the particulate heat carrier at 1700° F. to 2300° F. from combustion gases and passing said heat carrier to a synthesis gas generation zone;
(d) continuously feeding a carbonaceous feedstock and the particulate heat carrier to the synthesis gas generation zone at 1700° F. to 2300° F., the particulate heat carrier being fluidized in said synthesis gas generation zone, and contacting the heavy carbonaceous feedstock with steam and said fluidized heat carrier in said synthesis gas generation zone to produce synthesis gas and a particulate heat carrier at a temperature of 1500° F. to 2000° F., and recovering the synthesis gas; and
(e) continuously separating heat carrier at a temperature of from 1500° F. to 2000° F. from the synthesis gas generation zone and passing said particulate heat carrier to the pyrolysis zone of step (a) to provide the particulate heat carrier of step (a).

2. The process of claim 1 wherein the product stream is quenched and fractionated to produce a heavy carbonaceous residue.

3. The process of claim 2 wherein the heavy carbonaceous residue is fed continuously as feedstock to the synthesis gas generation zone.

* * * * *